United States Patent
Waterman et al.

(10) Patent No.: US 8,788,458 B2
(45) Date of Patent: Jul. 22, 2014

(54) DATA CACHING FOR MOBILE APPLICATIONS

(75) Inventors: Lance Waterman, Parker, CO (US); Michael Ho, Danville, CA (US); Brian Keith Lorenz, Littleton, CO (US); Evan Peter Ireland, Wellington (NZ); Hemal Pandya, Pune (IN)

(73) Assignee: Sybase, Inc., Dublin, CA (US)

( * ) Notice: Subject to any disclaimer, the term of this patent is extended or adjusted under 35 U.S.C. 154(b) by 8 days.

(21) Appl. No.: 12/760,233

(22) Filed: Apr. 14, 2010

(65) Prior Publication Data

US 2011/0161290 A1    Jun. 30, 2011

Related U.S. Application Data

(60) Provisional application No. 61/290,940, filed on Dec. 30, 2009.

(51) Int. Cl.
*G06F 17/30* (2006.01)
*G06F 7/00* (2006.01)

(52) U.S. Cl.
CPC .... *G06F 17/30575* (2013.01); *G06F 17/30902* (2013.01); *Y10S 707/9994* (2013.01)
USPC ..................................... 707/610; 707/999.01

(58) Field of Classification Search
CPC ..................... G06F 17/30575; G06F 17/30902
See application file for complete search history.

(56) References Cited

U.S. PATENT DOCUMENTS

| | | | |
|---|---|---|---|
| 6,381,241 B1 | 4/2002 | Ghirnikar et al. | |
| 6,983,293 B2 * | 1/2006 | Wang | 1/1 |
| 7,130,871 B2 | 10/2006 | Acree et al. | |
| 7,467,389 B2 | 12/2008 | Mukkamala et al. | |
| 7,512,638 B2 | 3/2009 | Jhaveri et al. | |
| 7,606,838 B2 | 10/2009 | Tobies | |

(Continued)

FOREIGN PATENT DOCUMENTS

| | | |
|---|---|---|
| KR | 10-2003-0072693 A | 9/2003 |
| KR | 10-2006-0060629 A | 6/2006 |
| KR | 10-2011-0074059 A | 6/2011 |

OTHER PUBLICATIONS

English Abstract for Korean Patent Pub. No. 10-2003-0072693 A, published Sep. 19, 2003, 1 page, from http://worldwide.espacenet.com.

(Continued)

*Primary Examiner* — Sangwoo Ahn
(74) *Attorney, Agent, or Firm* — Sterne, Kessler, Goldstein & Fox P.L.L.C.

(57) ABSTRACT

Systems, methods, computer program product embodiments and combinations and sub-combinations thereof for data caching and cache synchronization are described herein. An embodiment includes comparing data in a cache with data stored at a data source and determining database operations needed to synchronize one or more partitions of the cache with the data source. Each cache partition is associated with mobile business object (MBO) metadata of a distinct mobile device and the determined database operations are executed to synchronize the partitions with the data source. By refreshing only those partitions which are pertinent to a given device, embodiments of the invention may increase parallelism by allowing multiple partitions to refresh concurrently. The embodiment further comprises reviewing a caching policy associated with the cache. The caching policy may be selected in a manner that reduces data traffic and redundant requests on the data source.

14 Claims, 12 Drawing Sheets

(56) References Cited

U.S. PATENT DOCUMENTS

| | | | |
|---|---|---|---|
| 7,620,659 | B2 | 11/2009 | Novik et al. |
| 7,660,830 | B2 | 2/2010 | Ordille |
| 7,778,962 | B2 | 8/2010 | Shah et al. |
| 7,805,420 | B2 | 9/2010 | Kapoor et al. |
| 7,814,483 | B2* | 10/2010 | Li et al. .......... 717/177 |
| 7,853,561 | B2 | 12/2010 | Holenstein et al. |
| 7,882,062 | B2 | 2/2011 | Holenstein et al. |
| 7,962,458 | B2 | 6/2011 | Holenstein et al. |
| 8,037,056 | B2 | 10/2011 | Naicken et al. |
| 8,046,424 | B2 | 10/2011 | Novik et al. |
| 8,086,661 | B2 | 12/2011 | Holenstein et al. |
| 8,131,670 | B2 | 3/2012 | I Dalfo et al. |
| 8,166,101 | B2 | 4/2012 | Shah |
| 8,200,246 | B2 | 6/2012 | Khosravy et al. |
| 8,218,549 | B2 | 7/2012 | Dekel et al. |
| 8,238,696 | B2 | 8/2012 | Dart et al. |
| 2003/0110085 | A1 | 6/2003 | Murren et al. |
| 2004/0001498 | A1 | 1/2004 | Chen et al. |
| 2004/0133599 | A1 | 7/2004 | Warren et al. |
| 2004/0133644 | A1 | 7/2004 | Warren et al. |
| 2004/0148420 | A1 | 7/2004 | Hinshaw et al. |
| 2004/0205770 | A1 | 10/2004 | Zhang et al. |
| 2005/0021354 | A1 | 1/2005 | Brendle et al. |
| 2005/0055465 | A1 | 3/2005 | Sato |
| 2005/0055698 | A1 | 3/2005 | Sasaki et al. |
| 2005/0268032 | A1 | 12/2005 | Sikdar et al. |
| 2006/0112398 | A1 | 5/2006 | Mukkamala et al. |
| 2006/0123010 | A1 | 6/2006 | Landry et al. |
| 2007/0073808 | A1 | 3/2007 | Berrey et al. |
| 2007/0099640 | A1 | 5/2007 | Khushu et al. |
| 2007/0100834 | A1 | 5/2007 | Landry et al. |
| 2007/0260475 | A1 | 11/2007 | Bhanote |
| 2007/0260628 | A1 | 11/2007 | Fuchs et al. |
| 2007/0271275 | A1 | 11/2007 | Fassette et al. |
| 2008/0104133 | A1* | 5/2008 | Chellappa et al. .......... 707/201 |
| 2008/0120304 | A1 | 5/2008 | Calio et al. |
| 2008/0155525 | A1 | 6/2008 | Ho |
| 2008/0176536 | A1 | 7/2008 | Galluzzo et al. |
| 2009/0036102 | A1 | 2/2009 | Ho |
| 2009/0037395 | A1 | 2/2009 | Ireland et al. |
| 2009/0037430 | A1 | 2/2009 | Mukkamala et al. |
| 2009/0059512 | A1* | 3/2009 | Lydon et al. .......... 361/686 |
| 2009/0171679 | A1 | 7/2009 | Salgado et al. |
| 2009/0177800 | A1 | 7/2009 | Gidron et al. |
| 2009/0187622 | A1 | 7/2009 | Xie |
| 2009/0198772 | A1 | 8/2009 | Kim et al. |
| 2009/0222402 | A1 | 9/2009 | Tysowski |
| 2009/0247134 | A1* | 10/2009 | Jeide et al. .......... 455/414.2 |
| 2009/0254601 | A1 | 10/2009 | Moeller et al. |
| 2009/0307284 | A1 | 12/2009 | Welingkar et al. |
| 2010/0011075 | A1 | 1/2010 | Klassen et al. |
| 2010/0030783 | A1 | 2/2010 | Ho et al. |
| 2010/0169451 | A1 | 7/2010 | Barry |
| 2011/0154315 | A1* | 6/2011 | Singh et al. .......... 717/171 |
| 2011/0161290 | A1 | 6/2011 | Ireland et al. |
| 2011/0161339 | A1 | 6/2011 | Ireland et al. |
| 2011/0161349 | A1 | 6/2011 | Ireland et al. |
| 2011/0161383 | A1 | 6/2011 | Ho et al. |
| 2012/0166446 | A1 | 6/2012 | Bowman et al. |

OTHER PUBLICATIONS

English Abstract for Korean Patent Pub. No. 10-2006-0060629 A, published Jun. 5, 2006, 1 page, from http://worldwide.espacenet.com.

English Abstract for Korean Patent Pub. No. 10-2011-0074059 A, published Jun. 30, 2011, 1 page from http://worldwide.espacenet.com.

Extended Euorpean Search Report, dated Sep. 27, 2011, for European Patent Appl. No. 09803252.7, 7 pages.

Linthicum, "Chapter 11: Database-Oriented Middleware and EAI", In *Enterprise Application Integration*, Addison-Wesley, XP002579155, ISBN: 978-0-201-61583-8, May 1, 2000.

Linthicum, "Chapter 20: EAI Moving Forward," In *Enterprise Application Integration*, Addison-Wesley, XP002659187, ISBN: 0-201-61583-5, pp. 339-349, May 1, 2000.

Notification of Transmittal of the International Search Report and Written Opinion, dated Aug. 2, 2011, for PCT Appl. No. PCT/US2010/060293, 11 pages.

Notification of Transmittal of the International Search Report and Written Opinion, dated Aug. 5, 2011, for PCT Appl. No. PCT/US2010/060296, 9 pages.

Notification of Transmittal of the International Search Report and Written Opinion, dated Jul. 28, 2011, for PCT Appl. No. PCT/US2010/060290, 10 pages.

Notification of Transmittal of the International Search Report and Written Opinion, dated Mar. 18, 2010, for PCT Application No. PCT/US2009/004343, 11 pages.

Office Action mailed Apr. 24, 2012 in U.S. Appl. No. 12/503,573, Ho et al., filed Jul. 15, 2009, 14 pages.

Office Action mailed Sep. 19, 2011 in U.S. Appl. No. 12/503,573, Ho et al., filed Jul. 15, 2009, 13 pages.

Office Action, mailed Mar. 7, 2012 in U.S. Appl. No. 12/797,975, Ireland et al., filed Jun. 10, 2010, 8 pages.

Sinitsyn, A. "A Synchronization Framework for Personal Mobile Servers," Second IEEE Annual Conference on Pervasive Computing and Communications, Includes Workshop Papers, Orlando, Florida, pp. 1-5. Mar. 14-17, 2004.

U.S. Appl. No. 13/275,589, filed Oct. 18, 2011, entitled "Bulk Initial Download of Mobile Databases".

U.S. Appl. No. 13/286,372, filed Nov. 1, 2011, entitled "Entity Triggers for Materialized View Maintenance".

Aboulnaga, A., and Aref, W. G., "Window Query Processing in Linear Quadtrees," in Distributed and Parallel Databases, vol. 10, pp. 111-126 (2001).

Aref, W. G. and Samet, H., "Efficient Window Block Retrieval in Quadtree-Based Spatial Databases," in GeoInformatica, vol. 1, Chapter 1, pp. 59-91 (Apr. 1997).

Aref, W. G. and Samet, H., "Estimating Selectivity Factors of Spatial Operations," in Foundations of Models and Languages for Data and Objects, A. Heuer, & M. H. Scholl edition, pp. 31-43 (Aug. 14, 1993).

Fang, Y. et al., "Spatial Indexing in Microsoft SQL Server 2008," in Proceedings of the 2008 ACM SIGMOD International Conference on Arrangement of Data, ACM, New York, NY, pp. 1207-1215 (2008).

Gargantini, I., "An Effective Way to Represent Quadtrees," in Communications of the ACM, vol. 25, No. 12, ACM, New York, NY, pp. 905-910 (Dec. 1982).

Kothuri, R. K. V. et al., "Quadtree and R-Tree Indexes in Oracle Spatial: A Comparison Using GIS Data," in Proceedings of the 2002 ACM SIGMOD International Conference on Management of Data, ACM, New York, NY, pp. 546-557 (2002).

Kriegel, H.-P. et al., "Statistic Driven Acceleration of Object-Relational Space-Partitioning Index Structures," in Database Systems for Advances Applications, 14 pages, Jeju Island, Korea, Springer (2004).

Orenstein, J. A., "Redundancy in Spatial Databases," in Proceedings of the 1989 ACM SIGMOD International Conference on Management of Data, ACM, New York, NY, USA, pp. 294-305 (1989).

Samet, H., Foundations of Multidimensional and Metric Data Structures, Morgan Kaufmann, pp. 28-48, 191-193, 204-205, and 211-220 (2006).

Office Action mailed Aug. 10, 2012 in U.S. Appl. No. 12/649,527, filed Dec. 30, 2009, 12 pages.

Office Communication, dated Jun. 27, 2012, for U.S. Appl. No. 12/797,975, filed Jun. 10, 2010, 9 pages.

Office Communication, dated Apr. 11, 2012, for U.S. Appl. No. 12/813,104, filed Jun. 10, 2010, 16 pages.

Office Communication, dated Sep. 25, 2012, for U.S. Appl. No. 12/813,104, filed Jun. 10, 2010, 14 pages.

Office Communication, dated Aug. 27, 2012, for U.S. Appl. No. 13/286,372, filed Nov. 1, 2011, 12 pages.

Notification of Transmittal of the International Search Report and Written Opinion, dated May 29, 2012, for PCT Appl. No. PCT/US2011/065197, 9 pages.

(56) References Cited

OTHER PUBLICATIONS

U.S. Appl. No. 13/478,181, Lorenz et al., filed May 23, 2012, entitled "Cache Conflict Detection".

U.S. Appl. No. 13/478,185, Lorenz et al., filed May 23, 2012, entitled "Composite Graph Cache Management".

* cited by examiner

DATA CACHING FOR MOBILE APPLICATIONS

CROSS REFERENCE TO RELATED APPLICATIONS

This patent application claims the benefit of U.S. Provisional Patent Application No. 61/290,940, filed Dec. 30, 2009, entitled "Data Caching For Mobile Applications," which is incorporated herein by reference in its entirety.

BACKGROUND

1. Field

Embodiments of the present invention relate to data caching, and particularly towards data caching for mobile applications.

2. Background Art

Data owners are often concerned about shielding their data sources from unwanted or unexpected data requests. In particular, a data source that services a mobile application should not be exposed to an unpredictable amount of data requests from the mobile application.

Conventionally, mobile applications directly access data sources (e.g. enterprise data sources) to retrieve data. Because a plurality of mobile applications can make concurrent requests for data at different times, it often leads to an unexpected load on the data sources. Furthermore, because enterprise data typically exists in disparate formats at geographically distributed locations, servicing data requests from the mobile applications can be a resource intensive process.

Accordingly, systems, methods and computer program products are needed that efficiently respond to mobile application data requests while shielding data sources from being negatively impacted by such requests.

BRIEF SUMMARY

Briefly stated, the invention includes system, method, computer program product embodiments and combinations and sub-combinations thereof for data caching and cache synchronization.

An embodiment includes comparing data in a cache with data stored at a data source and determining database operations needed to synchronize one or more partitions of the cache with the data source. Each cache partition is associated with mobile business object (MBO) metadata of a distinct mobile device and the determined database operations are executed to synchronize the partitions with the data source. Furthermore, cache partitions can be refreshed independently. By refreshing only those partitions which are pertinent to a given device, embodiments of the invention may increase parallelism by allowing multiple partitions to refresh concurrently. The embodiment further comprises reviewing a caching policy associated with the cache. The caching policy may be selected in a manner that reduces data traffic and redundant requests on the data source.

In this way, embodiments of the present invention efficiently service mobile application data requests while shielding data sources from being negatively impacted or overloaded by such requests.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
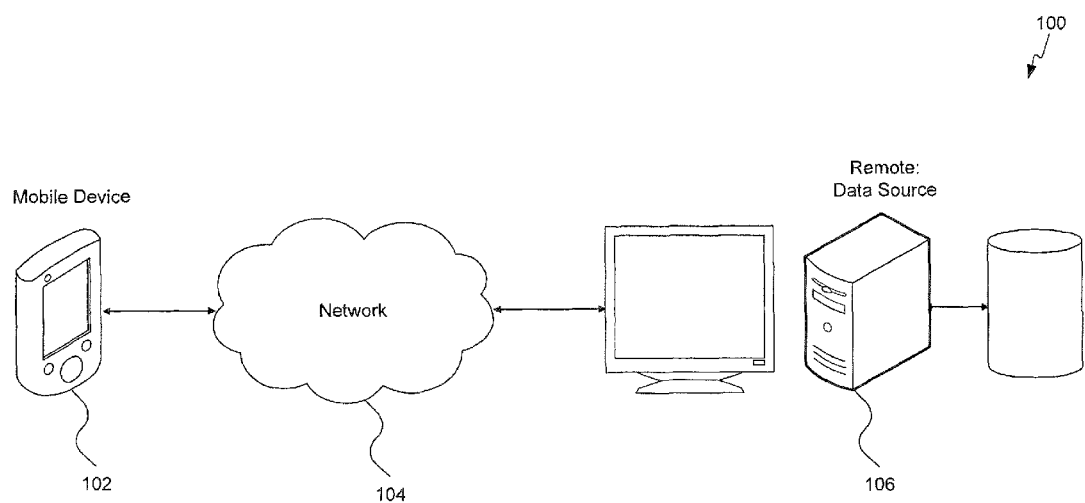
FIG. 1 is exemplary network architecture in which embodiments of the present invention, or portions thereof, are implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the invention.

FIG. 1 is an example network architecture 100 in which embodiments of the present invention, or portions thereof, are implemented. Network architecture 100 includes a mobile device 102 connected over a network 104 to a server 106, in accordance with an embodiment of the present invention. In accordance with a further embodiment of the present invention, a developer writes a software application for deployment on mobile device 102. The software application is written to occasionally retrieve data from server 106. When the software application attempts to retrieve data from server 106, network 104 may or may not be available. One skilled in the relevant arts will appreciate that mobile device 102 may be any computing device connected over a network, such as network 104, to a server, and need not be a mobile device.

An exemplary system framework and mobile business objects (MBOs) are described in greater detail further below, with continuing reference to FIG. 1.

II. System Framework

Figure 2:
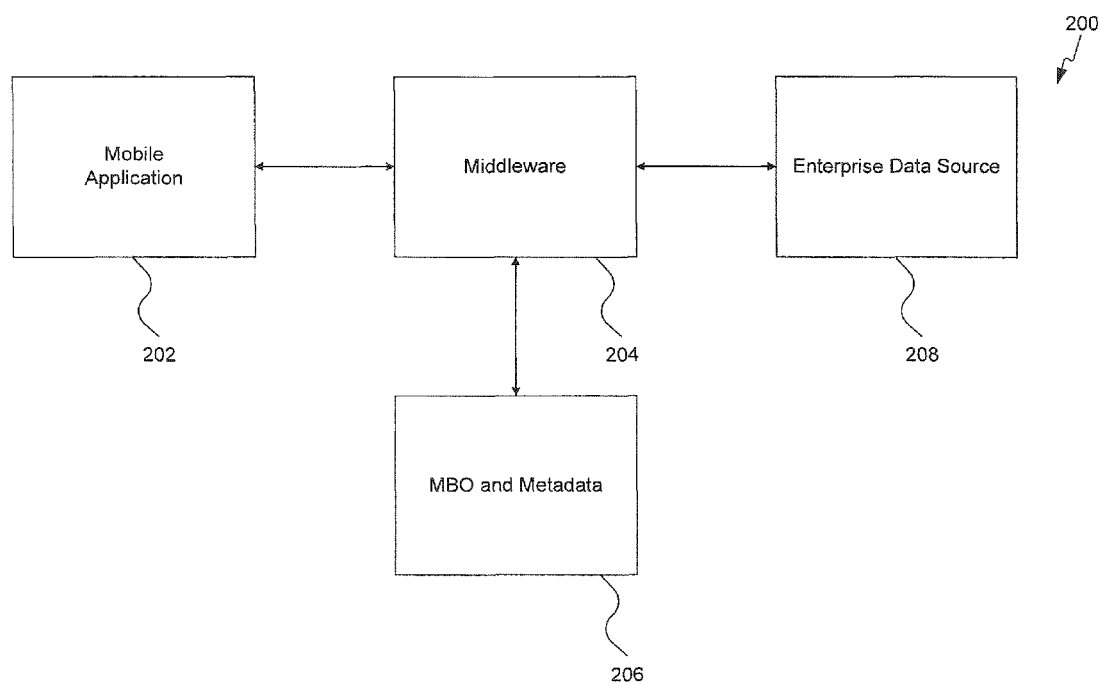
FIG. 2 is an example system framework, according to an embodiment.

FIG. 2 is an example framework 200, in accordance with an embodiment of the present invention. Framework 200 defines a mobile application 202, middleware 204, a MBO 206 having associated metadata and data, and enterprise data source 208, in accordance with an embodiment of the present invention. One skilled in the relevant arts will appreciate that the arrangement shown in framework 200 of FIG. 2 is presented by way of example, and not limitation. In accordance with an embodiment of the present invention, mobile application 202 is operable to run on mobile device 102 of FIG. 1. In accordance with a further embodiment of the present invention, enterprise data source 208 is equivalent to the server 106 of FIG. 1.

Mobile application 202 accesses data in enterprise data source 208 by making calls to an API or other interface of middleware 204, in accordance with an embodiment of the present invention. In accordance with an embodiment of the present invention, middleware 204 is the iAnywhere Mobilink middleware provided by Sybase, Inc. of Dublin, Calif. One skilled in the relevant arts will appreciate that enterprise data source 208 may be any number of types of data sources, including, for example, a relational database or a remote procedure. Middleware 204 facilitates communications, through the use of its API, by an application to one or more data sources, such as enterprise data source 208.

MBO 206 is a representation of a subset of data contained in enterprise data source 208, in accordance with an embodiment of the present invention. In accordance with a further embodiment of the present invention, MBO 206 represents multiple data sources simultaneously (i.e. MBO 206 comprises subsets of multiple data sources). MBO 206 is expressed using metadata, which is interpreted by the software of mobile application 202 to facilitate access of data from enterprise data source 208 through middleware 204. An example MBO is described in greater detail in U.S. patent application Ser. No. 12/503,573, filed on Jul. 15, 2009, entitled "Metadata Driven Mobile Business Objects," which is incorporated by reference herein in its entirety.

In an embodiment, not intended to limit the invention, enterprise data source 208 provides access to enterprise resources. As an example, enterprise resources (ERs) include, but are not limited to, database management systems (DBMS), SAP enterprise systems, web services, data files, hyper text transfer protocol (HTTP) systems and even spreadsheets. In addition, and according to an embodiment, third parties (e.g. customers etc.) may extend functionality of enterprise data source 208 to integrate with additional data sources (not shown).

III. Caching Module 310 and Cache 312

Figure 3:
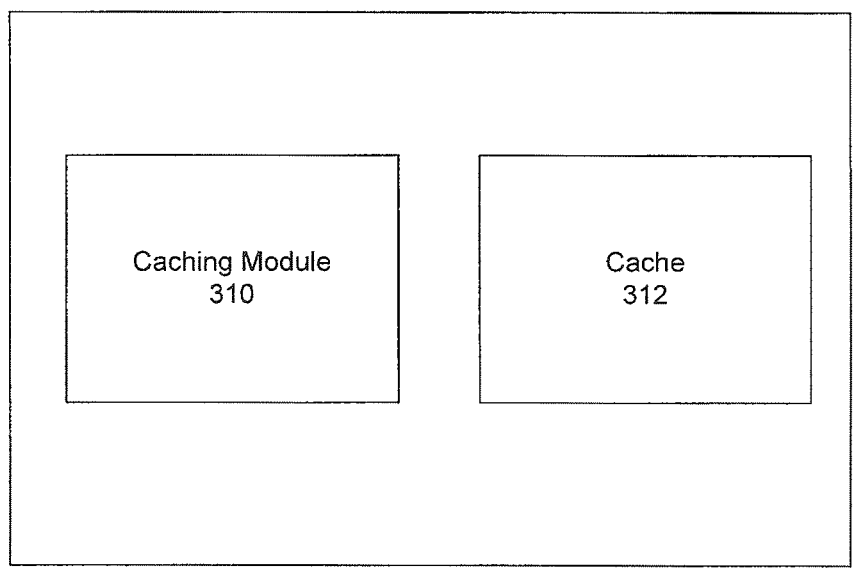
FIG. 3 illustrates a diagram of middleware in greater detail, according to an embodiment.

FIG. 3 illustrates a diagram of middleware 204 in greater detail. As shown in FIG. 3, middleware 204 includes caching module 310 and cache 312. In an embodiment, not intended to limit the invention, middleware 204 acts as an interface between mobile application 202 and enterprise data source 208. In an embodiment, middleware 204 reduces unwanted or unexpected loads (e.g. unpredictable data requests) on enterprise data source 208 using caching module 310 and cache 312. In particular, according to an embodiment, middleware 204 services mobile application data requests using caching module 310 and cache 312. Thus, at times, mobile application 202 need not invoke direct requests on enterprise data source 208 or any other backend enterprise information systems.

In this way, embodiments of the present invention efficiently service mobile application data requests while shielding data sources from being negatively impacted or overloaded by the requests.

Figure 4:
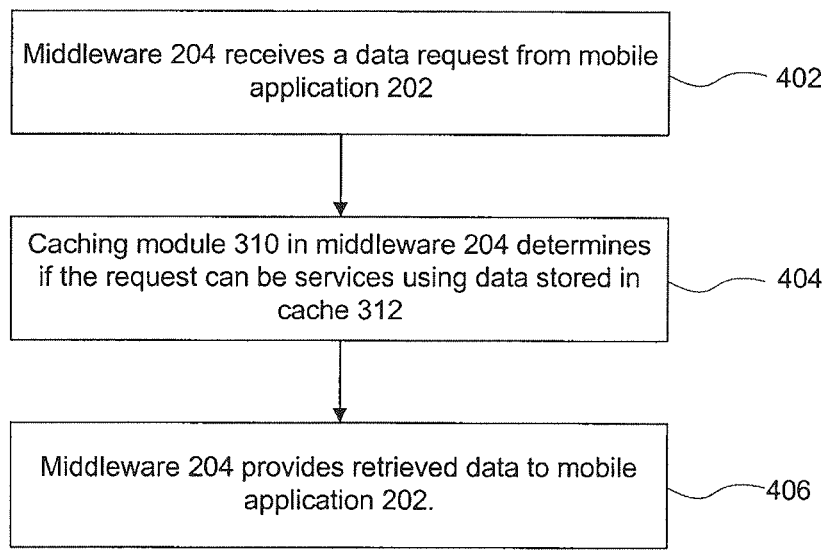
FIG. 4 is a flowchart illustrating an exemplary overall operation of middleware and a caching module, according to an embodiment.

FIG. 4 is a flowchart illustrating an exemplary overall operation of middleware 204 and caching module 310, according to an embodiment.

In step 402, middleware 204 receives a data request from mobile application 202.

In step 404, caching module 310 in middleware 204 determines if the request can be serviced using data stored in cache 312. As a purely illustrative example, if data is stored in cache 312, caching module 310 provides the data to mobile application 202 without retrieving data from enterprise data source 208. If the requested data is not stored in cache 312, caching module 310 may selectively retrieve data from enterprise data source 208. As discussed above, selective retrieval of data from the data source may be accomplished by applying mobile application 202 (or mobile device 102) specific context as parameters to enterprise data queries/requests. In this way, for example, data retrieved from enterprise data source 208 may be configured specifically for mobile application 202 (or mobile device 102).

In step 406, middleware 204 provides the requested data to mobile application 202.

The operation of caching module 310 and cache 312 is described in detail further below.

Embodiments of the invention enable metadata driven applications using caching module 310 (e.g. metadata driven mobile application 202). In an embodiment, not intended to limit the invention, metadata in MBO and metadata 206 includes information necessary to connect to enterprise data source 208 and maintain its associated cache tables. As a purely illustrative example, each cache table may be associated with the following data and metadata:

(a) Cache Content

In an embodiment, cache content may be minimally cached. In other words, for example, cache content is limited to data needed for servicing download requests from mobile application 202. In another embodiment, data may be fully cached and all system fields and data from enterprise data source 208 (that is associated with a MBO) can be cached in cache 312.

(b) Caching Policy

Exemplary caching policies used by caching module 310 can include, but are not limited to, scheduled, on-demand, row level and synchronized caching policies.

Exemplary cache content and caching policies are described further below.

IV. Caching Policies

In an embodiment, caching module 310 supports a plurality of caching policies.

As an example, such caching policies determine how caching module 310 and middleware 204 cache data from enterprise data source 208. Exemplary caching policies of caching module 310 are listed and described below.

(a) Real-Time Access Caching Policy

In an exemplary real-time access caching policy, no data may be cached in caching module 310 (except for primary keys, etc.) other than in data that is already in cache memory. Furthermore, data may be cached for the duration of transfer to mobile device 102 from enterprise data source 208. As an example, once the transfer of cached data to mobile device 102 is complete, the cached data may be deleted by caching module 310.

(b) Schedule Based Caching Policy

In an exemplary schedule based caching policy, a user (or administrator) may define a schedule on which a cache entry in caching module 310 should be updated. Thus, the cache entry is updated based on a pre-defined schedule. As an example, not intended to limit the invention, a user can define when and how often a cache entry in cache 312 is updated based on time intervals and a calendar date.

Figure 5A:
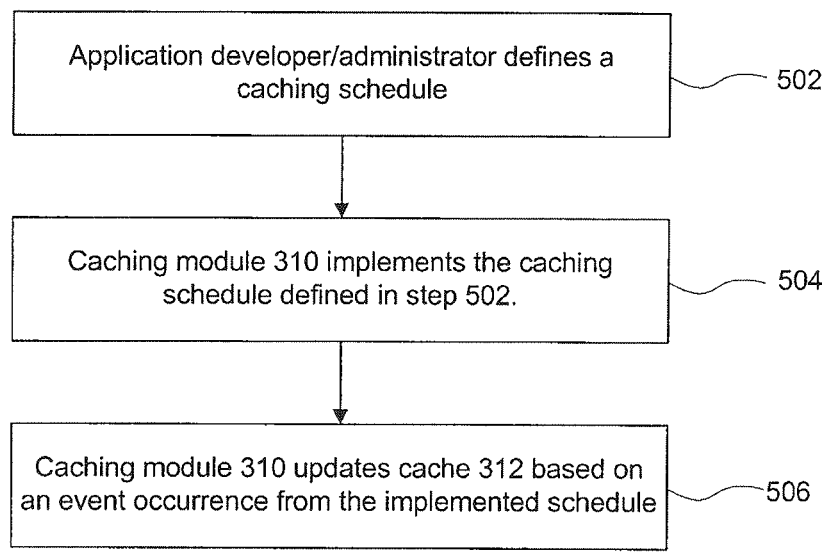
FIG. 5A is a flowchart illustrating an exemplary schedule based caching policy, according to an embodiment.

FIG. 5A is a flowchart illustrating an exemplary schedule based caching policy.

In step 502, an application developer/administrator (e.g. a developer/administrator of mobile application 202) defines a caching schedule.

In step 504, caching module 310 implements the caching schedule defined in step 502.

In step 506, caching module 310 updates cache 312, based on a caching schedule event occurrence, from the schedule implemented in step 504. As an example, caching module 310 updates cache 312 when a scheduled event 'fires' (or occurs) from the schedule implemented in step 504.

(c) On-Demand Caching Policy

In an exemplary on-demand caching policy, data may be assigned a 'coherence window' and added to cache 312 the first time the data (from enterprise data source 208) is accessed by middleware 204. On subsequent accesses by middleware 204, the coherence window is checked to determine, for example, if the cache entry has expired (or out of date). If the cache entry has expired, caching module 310 updates cache 312 and current or up-to-date data is returned to middleware 204.

Figure 5B:
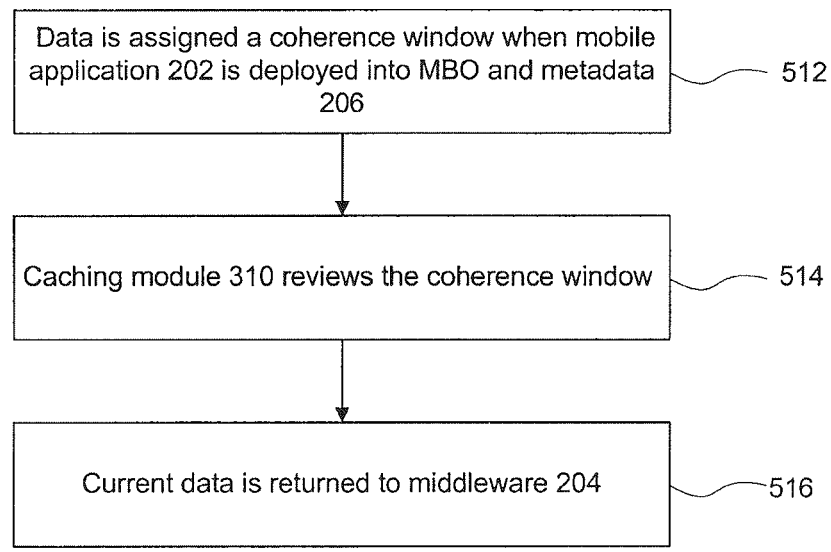
FIG. 5B is a flowchart illustrating an exemplary on-demand caching policy, according to an embodiment.

FIG. 5B is a flowchart illustrating an exemplary on-demand caching policy.

In step 512, data in cache 312 is assigned a coherence window when mobile application 202 is deployed into MBO and metadata 206.

In step 514, caching module 310 reviews the coherence window at a subsequent access of the data to determine if a cache entry, corresponding to the accessed data, has expired or if the cache entry is current. For example, if the cache entry has expired, caching module 310 updates cache 312 with updated data from enterprise data source 208.

In step 516, current data (from cache 312) or up-to-date data (retrieved from enterprise data source 208) is returned to middleware 204.

(d) Row Level Refresh Caching Policy

In an exemplary row level refresh caching policy, cache 312 is refreshed based on Create, Update and Delete notifications from middleware 204. Such Create, Update and Delete notifications can be generated from Create, Update and Delete commands that modify or update data in enterprise data source 208. Notifications received by caching module 310 during a data upload to enterprise data source 208 are applied prior to download to middleware 204. In this way, a download query from middleware 204 receives current data from enterprise data source 208. In an embodiment, the row level refresh caching policy may be combined with the on-demand and scheduled refresh caching policies to periodically synchronize cache 312 with enterprise data source 208.

Figure 5C:
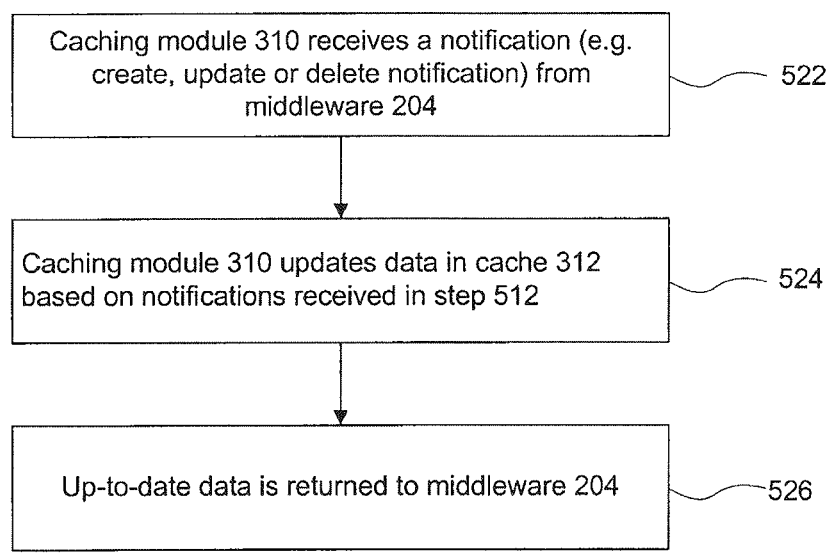
FIG. 5C is a flowchart illustrating an exemplary row level caching policy, according to an embodiment.

FIG. 5C is a flowchart illustrating an exemplary row level caching policy.

In step 522, caching module 310 receives a notification (e.g. create, update or delete notification) from middleware 204. As an example, such Create, Update and Delete notifications can be generated from Create, Update and Delete commands that modify or update data in enterprise data source 208.

In step 524, caching module 310 updates data in cache 312 based on notifications received in 522. For example, if a delete notification is received in response to delete operation performed on enterprise data source 208, caching module 310 may logically delete the corresponding data from cache 312 to synchronize cache 312 with enterprise data source 208.

In step 526, up-to-date data (retrieved from enterprise data source 208) corresponding to the data that was updated in step 522 is returned to middleware 204 by caching module 310. Furthermore, cache 312 can also be updated with data retrieved in step 526. In this way, embodiments of the invention account for updates to enterprise data initiated by business logic or other applications outside the scope of the mobile application 202.

In an embodiment, not intended to limit the invention, caching module 310 provides an external programmatic application program interface (API) to invalidate (or mark as unusable) data in cache 312. Once invalidated, cache 312 may be refreshed upon the next access or scheduled update by caching module 310. In another embodiment, caching module 310 may also provide an internal interface for middleware 204 to invalidate data in cache 312.

In an embodiment, caching module 310 associates system information (e.g. time and date) with entity instance data (e.g. MBO metadata) so that mobile device 102 can query for data that has changed since the last time the mobile device 102 was synchronized with server 106 (shown in FIG. 1). In this way, caching module 310 relieves network traffic/latency between mobile device 102 and the middleware 204.

V. Exemplary Cache Table Logical Schema

In an embodiment, not intended to limit the invention, each data entity type may have an associated cache table in cache 312. The cache table services download queries and named queries from middleware 204.

As an example, each cache table in cache 312 may include the following fields (columns):

(a) Surrogate Key—The surrogate key, for example, is a manufactured key that uniquely identifies a single instance of an entity (e.g. a MBO).

(b) Primary Key Fields—The primary key, for example, is associated with the backend or enterprise data source 208. In an embodiment, caching is also supported when enterprise data source 208 does not provide a primary key.

(c) On-Demand Query Fields—On demand queries, for example, may require that entity fields other than the primary key are to be located in cache 312. For example, a 'customer.findByRegion' query would require a region field in a cache table.

(d) Logical Delete Indicator—A logical delete indicator, for example, indicates that a data entity has been deleted. Rows that are marked for deletion will ultimately be physically deleted via an administrative action or scheduled activity. For example, caching module 310 may be configured to periodically perform a physical delete on rows that have been logically deleted for a certain number of days (e.g. 30 days).

(e) Last Modified Timestamp—A last modified timestamp, for example, indicates a time when a row in a cache table was last modified. As an example, this is a field internal to cache 312.

(f) Pending Indicator—A pending indicator, for example, indicates that a cached row in cache 312 is not synchronized with enterprise data source 208. In an embodiment, not intended to limit the invention, a pending indicator may have one of four (or more) values:

N—Not Pending
U—Update Pending
D—Delete Pending
C—Create Pending (g) Hashcode—A hashcode, for example, can be used for update detection in partially cached scenarios (e.g. when a subset of data from enterprise data source 208 is cached in cache 312). A hashcode field need not be used by cache 312 in a fully cached case (e.g. when all data from enterprise data source 208 is cached in cache 312). As an example, this is a field internal to cache 312.

(h) Partition Key—A partition key, for example, can be used for identifying sections of a cache table that are refreshed as an atomic (or single) unit. Such operation enables a more fine-grained refresh of a cache table as the entire cache table need not be refreshed.

The above listed fields are disclosed for the purposes of illustration and not limitation. Embodiments of the invention may also allow business data contained in enterprise data source 208 to be stored in the cache table. This allows a query to be serviced entirely by cache 312 without accessing enterprise data source 208 for the business data.

VI. Cache Refresh and Delta Processing

In an embodiment, when caching module 310 refreshes a cache table in cache 312, contents of enterprise data source 208 are compared with current contents of the cache table and a list of one or more 'deltas' is compiled. In an embodiment, deltas represent operations (e.g. insert, update, delete) that a cache refresh process needs to perform on the cache table in order to synchronize the cache table with enterprise data source 208.

(a) Delta Detection

Delta detection for keyed data (e.g. data associated with a primary key) involves comparing key-sorted contents of cache 312 with key-sorted contents of the enterprise data source 208. As an example, key-sorted content includes data that is grouped together based on shared primary key values. In an exemplary scenario where enterprise data source 208 does not support ordering results by a primary key, sorting can be performed within caching module 310. As an example, delete operations are indicated by primary keys that are present in cache 312 but are absent from enterprise data source 208. Insert operations, for example, may be indicated by primary keys that are present in enterprise data source 208 but absent from cache 312. Also, for example, update operations may be indicated by rows with matching primary keys in cache 312 and enterprise data source 208, but differing column values or hashcodes.

Figure 6A:
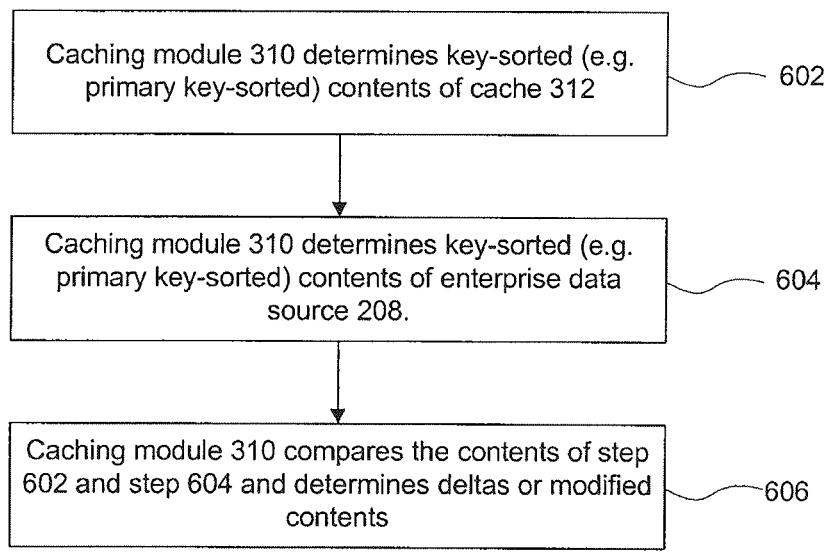
FIG. 6A is a flowchart illustrating an exemplary delta detection operation, according to an embodiment.

FIG. 6A is a flowchart illustrating an exemplary delta detection operation according to an embodiment.

In step 602, caching module 310 determines key-sorted (e.g. primary key-sorted) contents of cache 312.

In step 604, caching module 310 determines key-sorted (e.g. primary key-sorted) contents of enterprise data source 208.

In step 606, caching module 310 compares the contents of step 602 and step 604 and determines deltas or modified contents.

(b) Delta Processing

As discussed above, deltas represent operations (e.g. insert, update, delete) that a cache refresh process needs to perform on the cache table in order to synchronize the cache table with enterprise data source 208. Exemplary delta processing for insert, update and delete operations is described below. In the following, reference will be made to indicators/markers and hashcodes discussed in section V.

(i) Insert Processing—In an embodiment, when caching module 310 inserts a new row (e.g. during a refresh operation) into a cache table in cache 312, a last update timestamp is created. Furthermore a new surrogate key is created in cache 312, and a deleted indicator is set to false. If the cache table is partially cached, a hashcode field is computed and set.

(ii) Update Processing—In an embodiment, when a caching module 310 updates an existing row (e.g. during a refresh operation) in a cache table in cache 312, a last update timestamp is updated. If the cache table is minimally or partially cached, the hashcode field may be set by caching module 310. Furthermore, the insert pending marker is set to false.

(iii) Delete Processing—In an embodiment, when a caching module 310 deletes an existing row (e.g. during a refresh operation) in a cache table in cache 312, a last update timestamp is updated and a delete indicator is set to true.

Figure 6B:
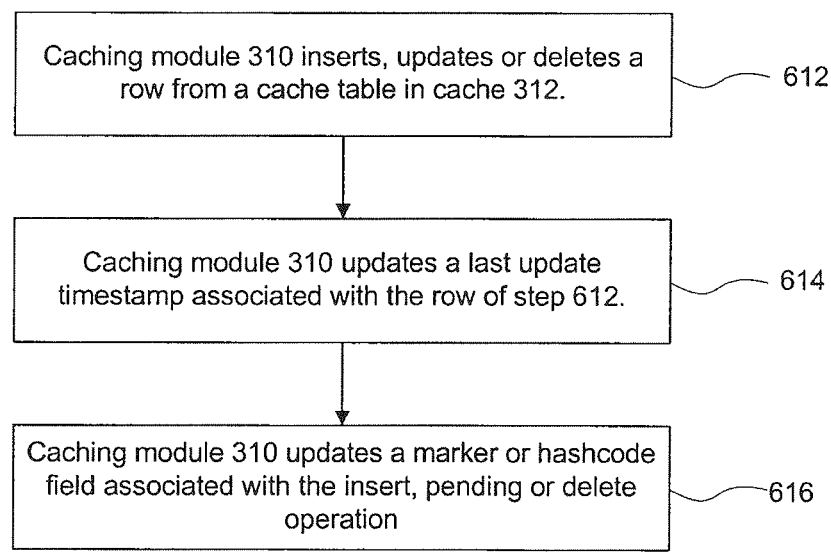
FIG. 6B is a flowchart illustrating an exemplary overall delta processing operation, according to an embodiment.

FIG. 6B is a flowchart illustrating an exemplary overall delta processing operation according to an embodiment.

In step 612, caching module 310 inserts, updates or deletes a row from a cache table in cache 312.

In step 614, caching module 310 updates a last update timestamp associated with the row of step 612.

In step 616, caching module 310 updates a marker or hashcode field associated with the insert, pending or delete operation.

In an embodiment, caching module 310 may support synchronized caching. Synchronized caching may not require delta detection because delta events are delivered directly to cache 312 via an external mechanism (e.g. a server, web service, etc.).

VII. Reducing Data Requests on Enterprise Data Source 208

In an embodiment, cache data requests on enterprise data source 208 may be reduced by selectively retrieving and using data stored within enterprise data source 208. In effect, when the caching module 310 determines it must refresh cache 312, such a refresh action may have reduced performance degradation of enterprise data source 208. The following exemplary cache loading methods may be used by caching module 310. In the following, reference will be made to exemplary caching policies described in section IV.

Cache Load

In this embodiment, when a scheduled or on-demand refresh occurs, all cached content of cache 312 may be compared with content of enterprise data source 208. In an embodiment, contents of enterprise data source 208 may be made available to caching module 310 and cache 312 via a 'loadAll' operation.

(a) Simple Cache Load Operation

In an embodiment, a 'loadAll' operation provides all data from enterprise data source 208 to cache 312 in a single invocation of the operation. Thus, for example, all rows from enterprise data source 208 could be cached into cache 312 in a single invocation of the 'loadAll' operation.

(b) Partitioned Cache Load Operation

In some exemplary scenarios, a partitioned cache load operation may be required. For example, a help desk system may allow clients to query open tickets based on their user name, but caching module 310 may cache all open tickets for all users, regardless of their user names. Such operation would allow several other users to query the same cache table (instead of enterprise data source 208) to retrieve their open tickets. In this way, data requests on enterprise data source 208 may be reduced.

As an example, partitioned cache load operation may offer several performance advantages. For example, cache partitions may be created by caching module 310 whenever the partitions are needed. For example, when a new mobile device is added to system 100 (or comes online) a plurality of new cache partitions, containing MBO data relevant to that device, would be created in cache 312.

In an embodiment, cache partitions may also be refreshed by caching module 310. In an embodiment, during synchronization only those partitions required by a synchronizing mobile device are loaded into cache 312. In this way, wasteful loading of irrelevant data is reduced. Furthermore, cache partitions can be refreshed independently. By refreshing only those partitions which are pertinent to a given device, embodiments of the invention may increase parallelism by allowing multiple partitions to refresh concurrently. Another advantage of portioned refreshing is that it may reduce operational memory footprint. For example, by refreshing smaller chunks of cache 312, caching module 310 may no longer need to aggregate results of multiple enterprise data source invocations before performing a complete refresh of the cache 312. Instead, caching module 310 can refresh one partition at a time.

Figure 7A:
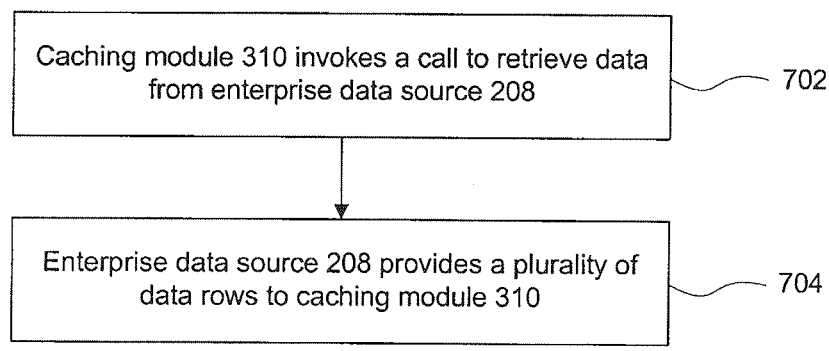
FIG. 7A illustrates an exemplary cache load operation, according to an embodiment.

FIG. 7A illustrates an exemplary cache load operation, according to an embodiment.

In step 702, caching module 310 invokes a call to retrieve data from enterprise data source 208. As an example, caching module 310 may invoke a 'loadAll' operation to retrieve data from enterprise data source 208.

In step 704, enterprise data source 208 provides a plurality of data rows to caching module 310 pursuant to the call of step 702.

Composite Load

In an embodiment, data requests to enterprise data source 208 can return data which may be transformed into multiple MBOs. For example, a single message may contain data necessary to populate an exemplary 'PurchaseOrder' MBO and several 'LineItem' MBOs.

In an embodiment, not intended to limit the invention, such composite output may be used to populate MBOs that are related by primary and foreign keys. However, in some instances (e.g. for performance or legacy compatibility reasons), data needed to populate multiple MBOs may be present in single output even though MBOs derived from that single output are not part of a MBO relationship.

In an embodiment, to efficiently handle such composite output, embodiments of the invention may allow a single operation to be associated with several MBOs where each MBO specifies the transformation and filters necessary to handle the portions of the composite output that are relevant to each respective MBO. As an example, transformations and filters may be defined by metadata stored in MBO and metadata 206.

In an embodiment, caching module 310 may support handling composite output during a full cache refresh operation and also a row level refresh operation.

In an embodiment, during a full refresh of cache 312, a single enterprise data source data request may be issued to retrieve data for populating a number of MBOs. Cache changes (e.g. deltas) computed from these results can be applied to a cache table in cache 312 in a single transaction. Furthermore, for example, virtual tables derived from a common composite output can share the same cache update policy.

In another embodiment, during a row level refresh operation, caching module 310 may rely on a "findByPrimaryKey" operation of a parent entity to return results for the parent entity's children. In an embodiment, when caching module 310 is notified of creates and updates to a parent cache table, composite output from the "findByPrimaryKey" operation can be used to refresh both the parent and child tables in cache 312.

Figure 7B:
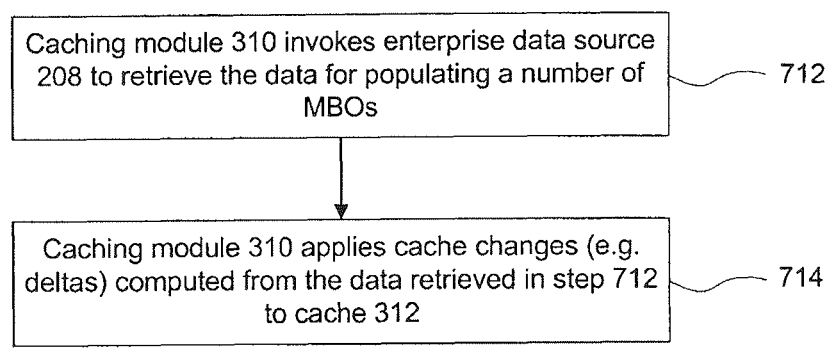
FIG. 7B illustrates an exemplary composite load operation, according to an embodiment.

FIG. 7B illustrates an exemplary composite load operation, according to an embodiment.

In step 712, caching module 310 invokes enterprise data source 208 to retrieve data for populating a number of MBOs.

In step 714, cache changes (e.g. deltas) computed from the data retrieved in step 712 are be applied to cache 312.

Data Change Notifications (DCN)

In an embodiment, external components inform caching module 310 that contents of cache 312 have changed by sending data change notifications (DCNs) to caching module 310. In an embodiment, DCNs may contain data changes themselves such that the changes can be applied directly to cache 312 by caching module 310. In another embodiment, a DCN may specify a name and parameters for an alternate read operation that may be invoked to retrieve current data from enterprise data source 208 and refresh a portion of cache 312.

VIII. Filtering Data Delivered to Mobile Application 202

In an embodiment, middleware 204 may define on-demand subscriptions as persistent user preferences. For example, a sales representative who is part of a north-west regional sales team would like to keep a customer list narrowed to customers found in the north-west (e.g. Washington state). Rather than requesting the sales representative to enter a preferred sales location each time they log on, embodiments of the invention may keep a persistent record of the representative's preferred choices. To support this exemplary methodology, caching module 310 may access on-demand preferences found within a on-demand subscription table in cache 312. For example, caching module 310 may execute the command:

com.sybase.uep.ds.executeQuery("customer.downLoad", input)

Referring to the above exemplary command, middleware 204 may pass a client identifier as an input parameter to caching module 310. Furthermore, for example, caching module 310 returns only the data that has changed since the last time a client device (e.g. mobile device 102) has synchronized.

In an embodiment, caching module 310 may use user preference tables to calculate candidate result set rows. Therefore, in an embodiment, middleware 204 passes a "last sync timestamp" as an input parameter to the caching module 310. Also, depending on caching policy, caching module 310 may fulfill a data acquisition request via a cache 312 or a data resource in enterprise data source 208 may be directly accessed.

Merge and Update Detection

In an embodiment, caching module 310 manages data update information so that intelligent data upload decisions can be made by middleware 204. In this way embodiments of the invention may keep remote device network traffic to a minimum.

In an embodiment, caching module 310 can manage one or more cache tables within cache 312. As an example, cache tables may maintain update information (e.g. timestamps and delete flags) for data that is changing in a data resource. Caching module 310 may also manage update events within cache 312. In an embodiment, middleware 204 may have a notifier application that polls a table in a mobile application database for new events. Such a notifier application can provide an event notification to registered device listeners of mobile device 102. Caching module 310 may populate a table that middleware 204 is polling for new events.

Runtime Application Program Interface (API)

In an embodiment, not intended to limit the invention, caching module 310 is associated with an API through which middleware 204 can read and write data from and to enterprise data source 208. As an example, the caching module API may run in middleware 204.

As an example, not intended to limit the invention, an API associated with caching module 310 can support the following example requirements of middleware 204:

1) The API may provide access to a collection of predefined data service operations.

2) The API may provide method(s) for invoking data service operations to request data from a back-end system or database.

3) The API may support requesting data via named queries.

4) The API may support requesting data via download cursors. A download cursor enables middleware 204 to selectively request data that has been modified since a particular time.

5) The API may provide method(s) for invoking data service operations which apply changes to a back-end system or database (or possibly to multiple such systems).

6) The API may provide method(s) for invoking data service operations that notify caching module 310 that changes have been made to enterprise data source 208.

7) The API may enable middleware 204 to request a list of remote client IDs that are likely to be interested in synchronizing due to recent data update events.

8) The API may support multiple named caching module 310 instances and may provide method(s) that middleware 204 can use to obtain references to individual data services.

9) The API may provide method(s) for providing connection context to a caching module 310 instance. As an example, the connection context is a Java Database Connectivity (JDBC) connection for use when communicating with a centralized consolidated database.

10) The API may provide methods(s) for providing transaction context to a caching module 310 instance.

11) The API may provide method(s) for providing security context to a caching module 310 instance. The security context may also be used to store arbitrary, tooling-defined and client-configured 'personalization parameters' that can represent credentials for JDBC connections and basic HTTP authentication.

12) The API may provide a method for indicating that a download phase is about to be initiated by caching module 310.

IX. Example Computer Embodiment

Figure 8:
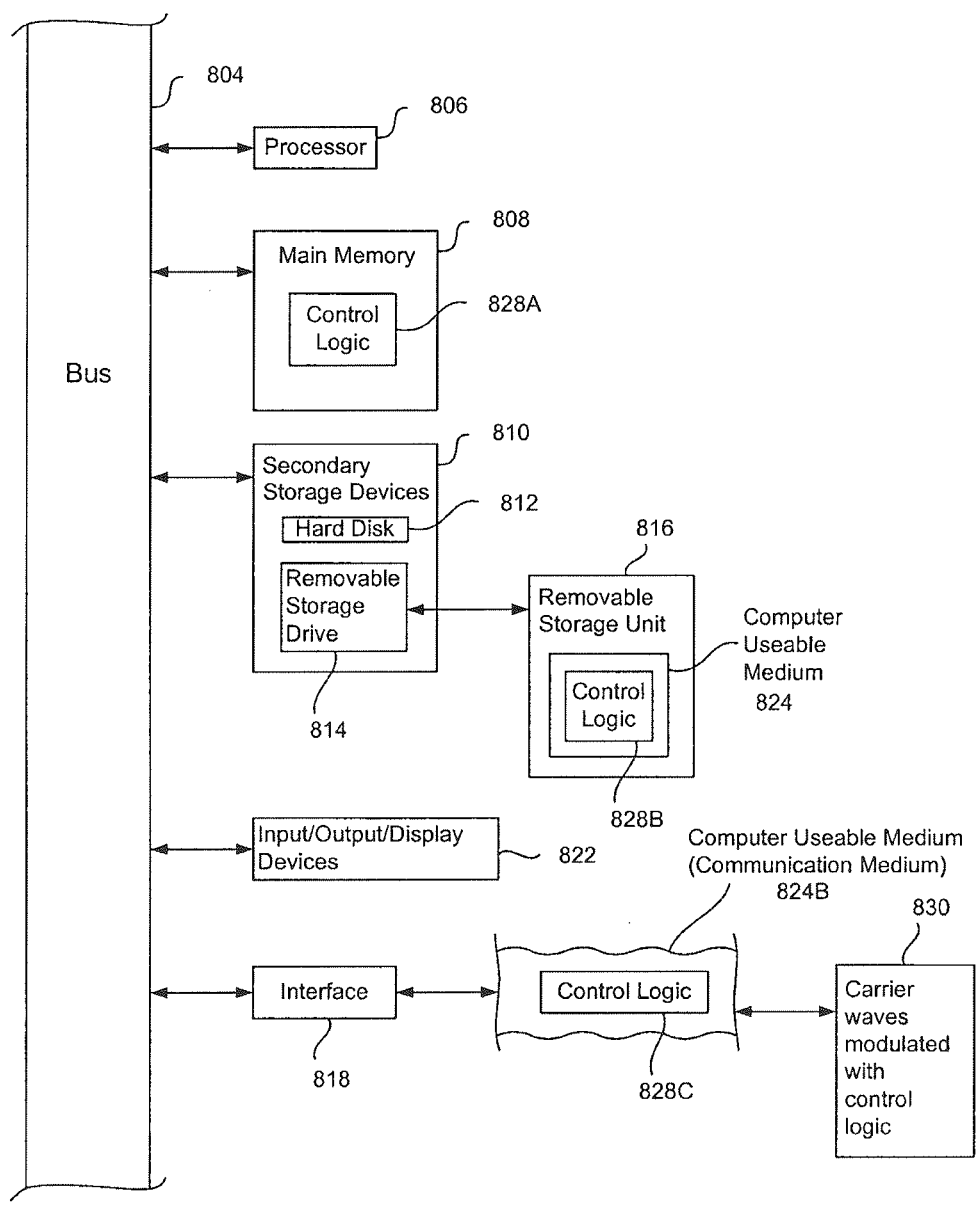
FIG. 8 depicts an example computer system in which embodiments of the present invention may be implemented.

In an embodiment of the present invention, the system and components of embodiments described herein are implemented using well known computers, such as computer 802 shown in FIG. 8. For example, mobile device 102 or middleware 204 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for cache synchronization, comprising:
   responsive to a request received at a device from a mobile device for content stored at a data source server, performing operations comprising:
      comparing data in a cache of said device with data stored at said data source server, wherein the cache includes a plurality of partitions, each partition being configured to include information from a plurality of data source servers; and
      synchronizing one or more partitions of said plurality of partitions with said data source server independently of other partitions of the plurality of partitions, wherein each partition of said one or more partitions contains at least a portion of a mobile business object (MBO) metadata of a particular data-requesting mobile device;
   reviewing a caching policy associated with said cache; and
   changing the caching policy based on the reviewing, comprising:
      assigning data in said cache to a coherence window, wherein the coherence window indicates whether the data has expired;
      reviewing said coherence window when said data in said cache is accessed; and
      updating data in said cache based on said coherence window, comprising:
         updating a row in a cache table in said cache;
         updating a timestamp associated with said row; and
         updating a marker identifying the updating of the row in the cache table in said cache;
   wherein said device, said mobile device, and said data source server are different devices.

2. The method of claim 1, wherein said changing further comprises:
   reviewing a pre-defined caching schedule
   where said updating said data in said cache occurs based on said caching schedule.

3. The method of claim 1, further comprising:
   receiving an event notification
   wherein said updating said data in said cache occurs based on said event notification,
   wherein said event notification is generated based on manipulation of data in said data source server.

4. The method of claim 1, further comprising:
   determining key-sorted contents of said cache;
   determining key-sorted contents of said data source server;
   comparing key-sorted contents of said cache and said data source server; and
   determining modified contents of said cache.

5. The method Of claim 1, further comprising:
   invoking a data request to said data source server; and
   retrieving a plurality of data rows from said data source server.

6. A computer-based system for caching of data, comprising:
   a processor; and
   a memory in communication with said processor, said memory storing a plurality of processing instructions that are configured to direct said processor to:
   responsive to a request received at a device from a mobile device for content stored at a data source server:
      compare data in a cache of said device with data stored at said data source server, wherein the cache includes a plurality of partitions, each partition being configured to include information from a plurality of data source servers; and
      synchronize one or more partitions of said plurality of partitions with said data source server independently of other partitions of the plurality of partitions, wherein each partition of said one or more partitions contains at least a portion of mobile business object (MBO) metadata of a particular data-requesting mobile device;
   review a caching policy associated with said cache; and
   change the caching policy based on the review, comprising:
      assign data in said cache to a coherence window, wherein the coherence window indicates whether the data has expired;
      review said coherence window when said data in said cache is accessed; and
      update data in said cache based on said coherence window, comprising:
         update a row in a cache table in said cache;
         update a timestamp associated with said row; and
         update a marker identifying the update of the row in the cache table in said cache;
   wherein said device, said mobile device, and said data source server are different devices.

7. The system of claim 6, wherein said cache further comprises;

a plurality of cache tables configured to store data retrieved from said data source server.

8. An article of manufacture including a non transitory computer-readable medium having instructions stored thereon that, if executed by a computing device, cause said computing device to perform operations, the operations comprising:
responsive to a request received at a device from a mobile device for content stored at a data source server:
comparing data in a cache of said device with data stored at said data source server, wherein the cache includes a plurality of partitions, each partition being configured to include information from a plurality of data source servers; and
synchronizing one or more partitions of said plurality of partitions with said data source server independently of other partitions of the plurality of partitions, wherein each partition of said one or more partitions contains at least a portion of mobile business object (MBO) metadata of a particular data-requesting mobile device;
reviewing a caching policy associated with said cache; and
changing the caching policy based on the reviewing, comprising:
assigning data in said cache to a coherence window, wherein the coherence window indicates whether the data has exired;
reviewing said coherence window when said data in said cache is accessed; and
updating data in said cache based on said coherence window, comprising:
updating a row in a cache table in said cache;
updating a timestamp associated with said row; and
updating a marker identifying the updating of the row in the cache table in said cache;
wherein said device, said mobile device, and said data source server are different devices.

9. The article of manufacture of claim 8, said operations further comprising:
reviewing a caching policy associated with said cache
wherein said changing occurs based on the reviewing.

10. The article of manufacture of claim 8, said changing comprising:
reviewing a pre-defined caching schedule
wherein said updating said data in said cache occurs based on said caching schedule.

11. The article of manufacture of claim 8, said operations further comprising:
receiving an event notification
wherein said updating said data in said cache occurs based on said notification,
wherein said event notification is generated based on manipulation of data in said data source server.

12. The article of manufacture of claim 8, said operations further comprising:
determining key-sorted contents of said cache;
determining key-sorted contents of said data source server;
comparing key-sorted contents of said cache and said data source server; and
determining modified contents of said cache.

13. The article of manufacture of claim 8, said operations further comprising:
invoking a data request to said data source server; and
retrieving a plurality of data rows from said data source server.

14. The method of claim 1, wherein each of the one or more partitions is dedicated to said mobile device.

* * * * *